US006154945A

United States Patent [19]

Voelzke

[11] Patent Number: 6,154,945

[45] Date of Patent: *Dec. 5, 2000

[54] PROCESS FOR REMOVING A SIGN DISPLAY MODULE

[75] Inventor: Vernon P. Voelzke, Brookings, S. Dak.

[73] Assignee: Daktronics, Inc., Brookings, S. Dak.

[ * ] Notice: This patent issued on a continued prosecution application filed under 37 CFR 1.53(d), and is subject to the twenty year patent term provisions of 35 U.S.C. 154(a)(2).

[21] Appl. No.: 09/140,205

[22] Filed: Aug. 26, 1998

[51] Int. Cl.[7] .............................. B23P 19/00; G09F 13/04

[52] U.S. Cl. ....................... 29/426.5; 29/426.1; 29/426.6; 40/564

[58] Field of Search ............................... 29/426.1, 426.5, 29/426.6; 40/574, 564

[56] References Cited

U.S. PATENT DOCUMENTS

| | | | |
|---|---|---|---|
| 2,766,540 | 10/1956 | Brown et al. | 40/564 |
| 2,877,584 | 3/1959 | Dupree | 40/564 |
| 3,023,524 | 3/1962 | Muse | 40/564 |
| 3,291,975 | 12/1966 | McCullough et al. | 362/235 |
| 3,594,761 | 7/1971 | Boesen et al. . | |
| 3,780,284 | 12/1973 | Dewhirst | 362/260 |
| 4,272,901 | 6/1981 | Matthews | 40/574 |
| 5,299,109 | 3/1994 | Grondal | 362/241 |
| 5,301,447 | 4/1994 | Lotter et al. | 40/603 |
| 5,410,328 | 4/1995 | Yoksza et al. . | |
| 5,532,711 | 7/1996 | Harris . | |
| 5,615,502 | 4/1997 | Gabrius | 40/570 |
| 5,729,924 | 3/1998 | Reading | 40/564 |
| 5,758,442 | 6/1998 | Flanigan et al. | 40/624 |

*Primary Examiner*—David P. Bryant
*Attorney, Agent, or Firm*—Hugh D. Jaeger

[57] ABSTRACT

Electronic indoor or outdoor alpha-numeric sign display system featuring readily accessible access to internally located electronic and other components from either the front or the rear of the sign display system for quick changeout of components. Opposing accessible spring latch rods located interiorly to a sign display module including a reflector/lens/louver assembly engage opposing catches on catch panels located in the interior of an enclosure or frame to secure the sign display module to the enclosure or frame. The spring latch rods are operated by special tools from the front or rear of the sign display system for disengagement of the sign display module from the enclosure or frame.

16 Claims, 16 Drawing Sheets

PROCESS FOR REMOVING A SIGN DISPLAY MODULE

BACKGROUND OF THE INVENTION

1. Field of the Invention

The present invention pertains to lighting displays or message boards for indoor or outdoor use, and, more particularly, relates to an electronic indoor or outdoor alpha-numeric sign display system which is easily and readily maintained by the provision of quick and easy access to the internally located components.

2. Description of the Prior Art

Prior art sign display systems were not always designed from the standpoint of easily and readily accomplished maintenance and, at best, ready access was often considered late in the execution of the design. Access often was provided either from the rear side or the front side of the sign display system and then required that a generous number of fasteners, such as screws, nuts, bolts, clips or the like be laboriously removed for separation of layered components and to disassemble the sign display system for access to the other internal components such as illuminating devices such as incandescent lights or LED's, circuit boards, power supplies or other such devices.

Clearly what is needed is a sign display system which incorporates quick and ready accessibility to the layered or other component members for the purpose of quick change-out or other maintenance such as is offered by the present invention, as now described. Front and rear access displays are the same with respect to manufactured assemblies, thereby reducing number of parts, and ordering confusion errors when servicing.

SUMMARY OF THE INVENTION

The general purpose of the present invention is to provide an improved electronic indoor or outdoor alpha-numeric sign display system which is constructed of major components including an enclosure or frame and a sign display module. Spring latch rods located on the sign display module extend horizontally and outwardly to engage catches on catch panels located on the side panels of the enclosure or frame to secure the sign display module to the enclosure or frame. Tools for front access and rear access to the spring latch rods are provided.

According to one or more embodiments of the present invention, there is provided an indoor or outdoor alpha-numeric sign display system including an enclosure or frame and a sign display module composed of a forward unit and a rearward unit. The forward unit or display side of the sign display module includes a reflector/lens/louver assembly which includes an array of reflectors and corresponding lenses, and rows of louvers interspersed horizontally along and about the array of reflectors and lenses; and the rearward unit includes an electronics circuit/light board assembly. The lens and reflector arrays secure between a left and a right side mounting channel. Aligned between the left and right side mounting channels are left and right EMI shield panels each having a matrix of apertures for accommodation of corresponding electronic circuit board mounted illuminating devices such as incandescent bulbs or LED's which illuminate the lenses in the reflector/lens/louver assembly. Also located and secured to the vertically aligned EMI shield panels are opposing horizontally aligned spring latch rods for securing of the sign display module to catches on catch panels located at the opposing left and right side panels of the enclosure or frame. The opposing spring latch rods extend through and slightly beyond orifices in the opposing left and right side mounting channels for the purpose of engaging the catches on the catch panels located in the interior of the opposing left and right side enclosure or frame panels. The enclosure or frame includes four connected planar panels including opposing planar top and bottom panels and opposing planar left and right side panels, and optionally may include a planar rear panel. A tool for accessing and disengaging the spring latch rods from the front of the enclosure or frame, and another tool for accessing and disengaging the spring latch rods from the rear of the enclosure or frame are provided.

One significant aspect and feature of the present invention is an indoor or outdoor alpha-numeric sign display system having quick change capabilities.

Yet another significant aspect and feature of the present invention is an indoor or outdoor alpha-numeric sign display system which is accessible from the front or the rear.

Still another significant aspect and feature of the present invention is an indoor or outdoor alpha-numeric sign display system requiring a minimum of tools for accessing the interior of the display system.

A further significant aspect and feature of the present invention is an indoor or outdoor alpha-numeric sign display system incorporating spring latch rods and catches to ensure secure engagement of component members and assemblies.

A still further significant aspect and feature of the present invention is an indoor or outdoor alpha-numeric sign display system in which the nucleus of attached components can be removed from the front or rear (depending on setup) of an enclosure or frame.

Having thus set forth distinguishing traits of the present invention, it is one object of the present invention to provide an indoor or outdoor alpha-numeric sign display system having easily accessible quick change capabilities.

Other features of the present invention are now set forth.

The cost of module attachment parts is very minimal with only a piece of ⅛ inch diameter rod 6 inches long and a small amount of sheet stock for release tools. Other aspects of the quick change sign display system are incorporated into already required parts, and thus parasitic parts are minimized. The labor and expense of installing the many small parts of other commercially available fasteners such as quarter-turn fasteners is eliminated. The fastening system is captive. That is, it is secured to the sign display module at all times and will not fall from the sign display module when the sign display module is removed from the enclosure or frame for service. Labor of factory assembly is reduced over conventional methods of sign display module attachment.

BRIEF DESCRIPTION OF THE DRAWINGS

Other objects, aspects and features of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENT

Figure 1:
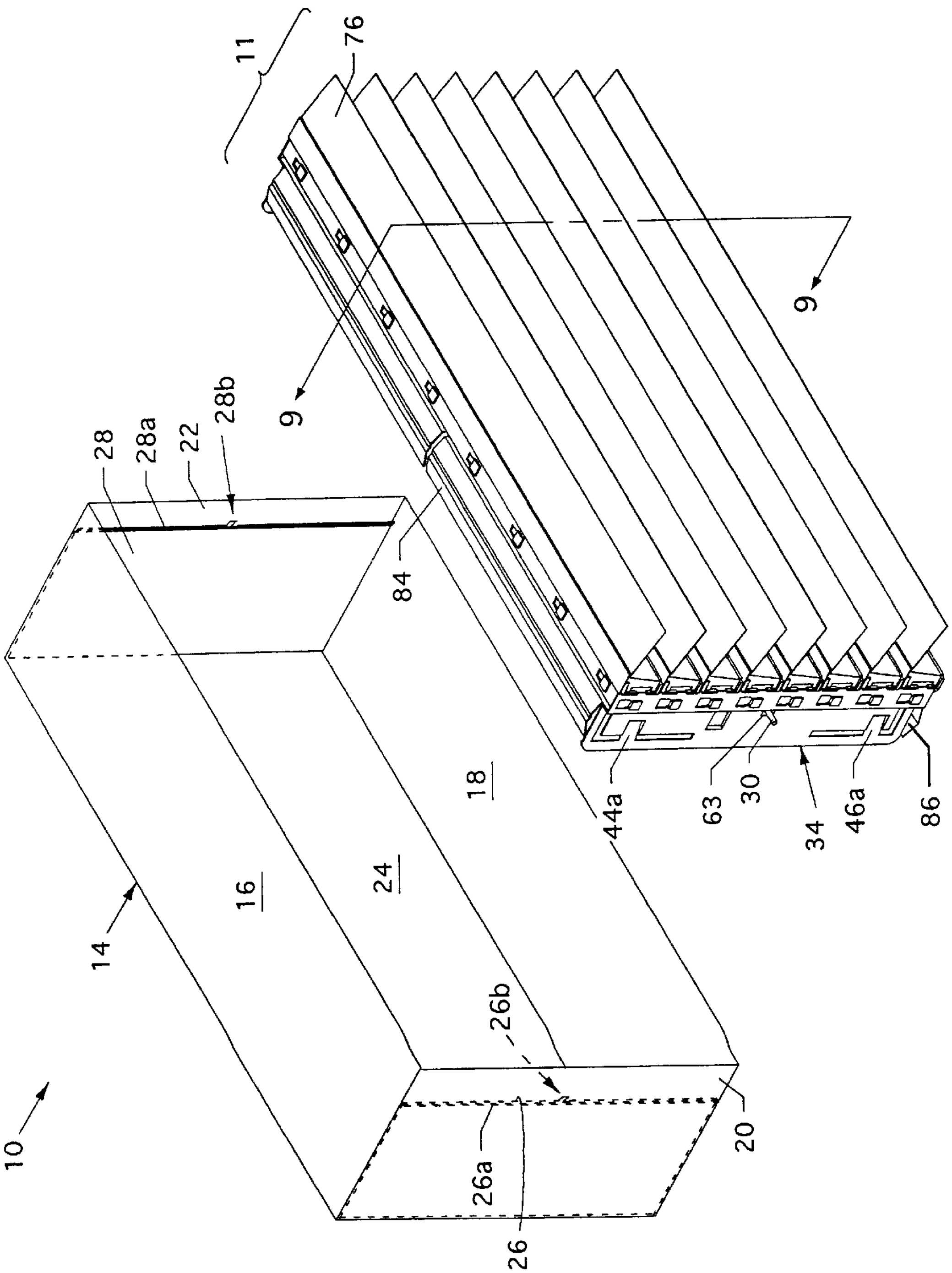
FIG. 1 illustrates an isometric view of an enclosure or frame and a sign display module of the electronic indoor or outdoor alpha-numeric sign display system, known herein as the sign display system.

FIG. 1 illustrates an isometric view of components of an electronic indoor or outdoor alpha-numeric sign display system, known herein as the sign display system 10. The sign display system 10 includes a sign display module 11 composed of a forward unit 12 (FIG. 2) and a rearward unit 13 (FIG. 2) the main structure of which engages and aligns to the interior of an enclosure or frame 14. The enclosure or frame 14 includes four connected planar panels including opposing planar top and bottom panels 16 and 18 and opposing planar left and right side panels 20 and 22, and optionally may include a planar rear panel 24. A left catch panel 26 having an angled end 26*a* and a catch 26*b* extending from the angled end 26*a* aligns and secures to the planar left side panel 20, and, in a similar fashion, a right catch panel 28 having an angled end 28*a* and a catch 28*b* extending from the angled end 28*a* aligns and secures to the planar right side panel 22. Opposing left and right spring latch rods 30 and 32 (FIG. 3) extend from the sides of the sign display module 11 to engage the left and right catches 26*b* and 28*b*, respectively, to secure the sign display module 11 to the interior of the enclosure or frame 14.

Figure 2:
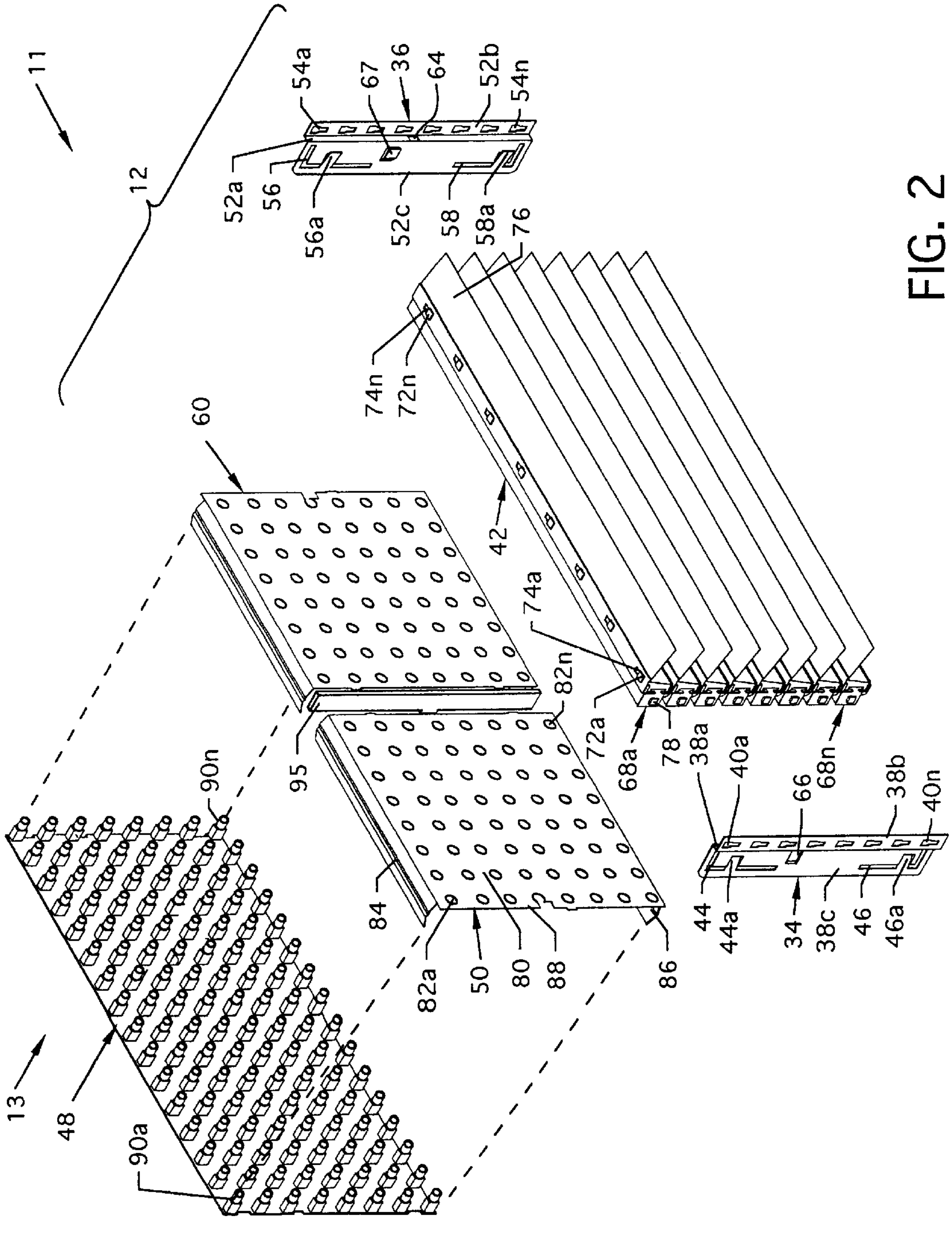
FIG. 2 illustrates an exploded front view of the sign display module of FIG. 1.
Figure 3:
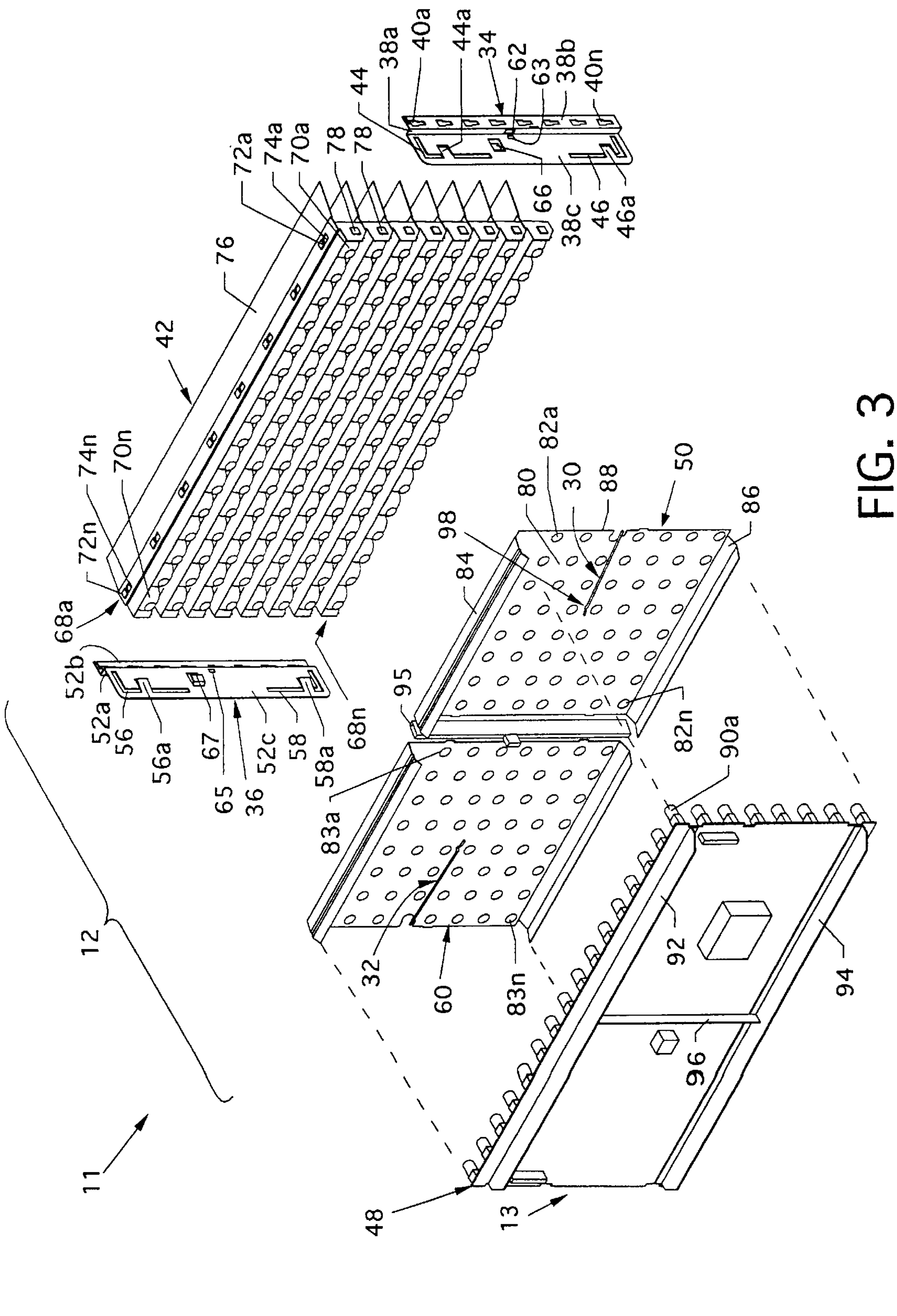
FIG. 3 illustrates an exploded rear view of the sign display module of FIG. 1.

FIGS. 2 and 3 illustrate exploded front and rear views, respectively, of the forward unit 12 and the rearward unit 13 which make up the sign display module 11 of FIG. 1, where all numerals correspond to those elements previously or otherwise described. Vertically oriented left and right mounting channels 34 and 36 are provided for securing thereto of other elements shown in these figures. The left mounting channel 34 includes a narrow center panel 38*a* having a forward panel 38*b* extending at a right angle and forwardly therefrom and a rearward panel 38*c* extending at a right angle and rearwardly therefrom. Included in the forward panel 38*b* are a plurality of vertically oriented slots 40*a*–40*n* which engage one end of a reflector/lens/louver assembly 42, as later described in detail. Included in the rearward panel 38*c* are cutouts 44 and 46 which form inwardly angled retainer tabs 44*a* and 46*a*, respectively, each of which bears directly against the left rearward surface of a circuit/light board assembly 48 to retain the circuit/light board assembly 48 and also to capture one edge of a left EMI shield panel 50 between the reflector/lens/louver assembly 42 and the circuit/light board assembly 48 to form in part the forward unit 12. The right mounting channel 36 includes a narrow center panel 52*a* having a forward panel 52*b* extending at a right angle and forwardly therefrom and a rearward panel 52*c* extending at a right angle and rearwardly therefrom. Included in the forward panel 52*b* are a plurality of vertically oriented slots 54*a*–54*n* which engage one end of a reflector/lens/louver assembly 42, as later described in detail. Included in the rearward panel 52*c* are cutouts 56 and 58 which form inwardly angled retainer tabs 56*a* and 58*a*, respectively, each of which bears directly against the right rearward surface of the circuit/light board assembly 48 to retain the circuit/light board assembly 48 and also to capture one edge of a right EMI shield panel 60 between the reflector/lens/louver assembly 42 and the circuit/light board assembly 48 to form in part the forward unit 12. A front release tool slot 64 is illustrated substantially at the midpoint of the center panel 52*a* of the right mounting channel 36 and a corresponding front release tool slot 62 (FIG. 3) is illustrated substantially at the midpoint of the center panel 38*a* of the left mounting channel 34. A passage 63 is located in the rearward panel 38*c* in close proximity to the front release tool slot 62 in the center panel 38*a*. One end of the left spring latch rod 30 extends through the passage 63. Correspondingly, a passage 65 is located in the rearward panel 52*c* in close proximity to the front release tool slot 64 in the center panel 52*a* for passage of one end of the right spring latch rod 32. Additionally, die cut fulcrum tabs 66 and 67 extend inwardly and are offset from the planes of the rearward panels 38*c* and 52*c*, respectively. Front release tool slots 62 and 64, in part, are utilized for front side release access of the sign display module 11 from the enclosure or frame 14; and the fulcrum tabs 66 and 67, in part, are utilized for rear side release of the sign display module 11 from the enclosure or frame 14, as later described in detail.

The reflector/lens/louvre assembly 42 is formed of a plurality of like vertically stacked and connected modules 68*a*–68*n*, such as module 68*a*, where horizontally aligned rows of connected reflector and lens combinations 70*a*–70*n* include a plurality of configured protrusions 72*a*–72*n* which slidingly engage a plurality of slots 74*a*–74*n* located along and near one edge of a horizontally aligned louvre 76. Similarly configured single left protrusions 78 and single right protrusions (not shown) are located at opposing ends of the module 68*a* as well as at the opposing ends of the remaining modules 68*b*–68*n*. As illustrated, the aligned single left protrusions 78 at the end of each module 68*a*–68*n* align in vertical combination to align with and to engage the plurality of slots 40*a*–40*n* on the left mounting channel 34. The right mounting channel 36 connects to the opposing end in the same manner as just described.

Figure 4:
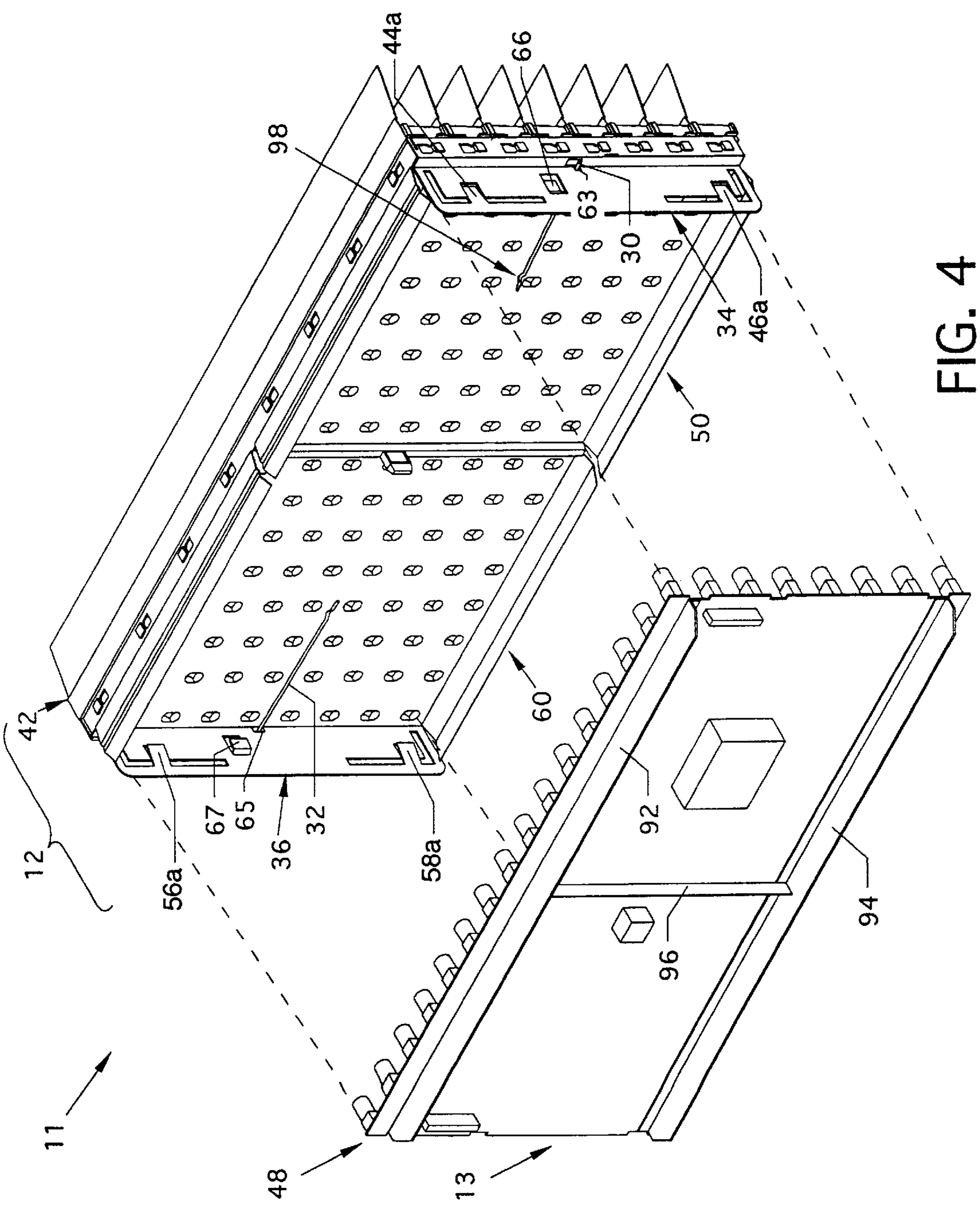
FIG. 4 illustrates an isometric rear view of the sign display module showing the assembled forward unit and the rearward unit.

Left and right EMI shields 50 and 60 are constructed in mirror like images of each other. The left EMI shield 50, now described, includes a planar portion 80 having an orifice matrix including orifices 82*a*–82*n* which align with the columns of similar reflector and lens combinations 70a–70n formed by the stacked modules 68a–68n. A top angled surface 84 and a lower angled surface 86 offer spring-like contact and engagement with the top and bottom panels 16 and 18 of the enclosure or frame 14 and extend rearwardly and substantially at a right angle from the planar portion 80 but do not extend horizontally along the full length but extend short of the full length to delineate a narrow vertically aligned tab 88 which is instrumental in mounting the outer region of the left EMI shield 50 behind the left half of the reflector/lens/louver assembly 42. The left EMI shield 50 is first aligned to the left rear of the reflector/lens/louver assembly 42, and the vertically aligned tab 88 is secured thereto, in sandwich fashion, by the center panel 38a of the left mounting channel 34, the slots 40a–40n of which engage the left protrusions 78 on the stacked modules 68a–68n, as illustrated in FIG. 4. Left spring latch rod 30 anchors, as later described in detail, to the left EMI shield 50 and to the left of the EMI shield 50 center. A spacer bar 95 aligns between the inner vertical edges of the left and right EMI shield panels 50 and 60. The right EMI shield panel 60 and components, being mirror-like images of the left EMI shield panel 50 and components and having similar attributes, are not described in detail for purpose of brevity. Together the reflector/lens/louver assembly 42, the left and right EMI shield panels 50 and 60, and the left and right mounting channels 34 and 36 comprise the forward unit 12.

The rearward unit 13 is composed of circuit/light board assembly 48 which includes approximate circuitry, a power supply, and a matrix of illuminating devices such as incandescent lights 90a–90n, or other suitable illumination devices, which align through the orifices 82a–82n of the left EMI shield panel 50 and corresponding orifices 83a–83n in the right EMI shield panel 60 into the reflector and lens combinations 70a–70n in the reflector/lens/louver assembly 42. Upper and lower support bars 92 and 94 forming part of circuit/light board assembly 48 align horizontally near the top and bottom edges thereof, and another support bar 96 extends between the upper and lower support bars 92 and 94.

FIG. 4 illustrates an isometric rear view of the sign display module 11 showing the assembled forward unit 12 and the rearward unit 13, where all numerals correspond to those elements previously or otherwise described.

Figure 5:
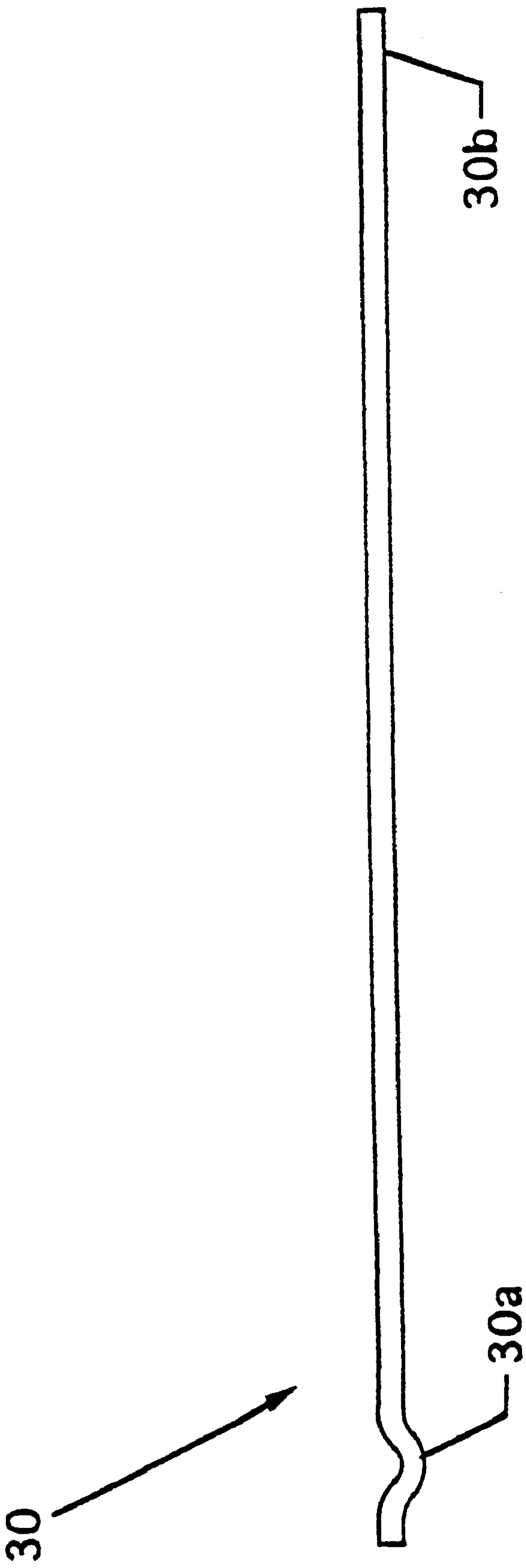
FIG. 5 illustrates a rear view of the left spring latch rod rotated to reveal a curved section at one end.

FIG. 5 illustrates a rear view of the left spring latch rod 30 rotated 90° to reveal a curved section 30a at one end. The left spring latch rod 30 includes an outboard end 30b which engages a previously illustrated catch 26b on the left catch panel 26. The curved section 30a is inserted into and self-secured in a configured cutout 98 shown in FIG. 6, as later described in detail.

Figure 6:
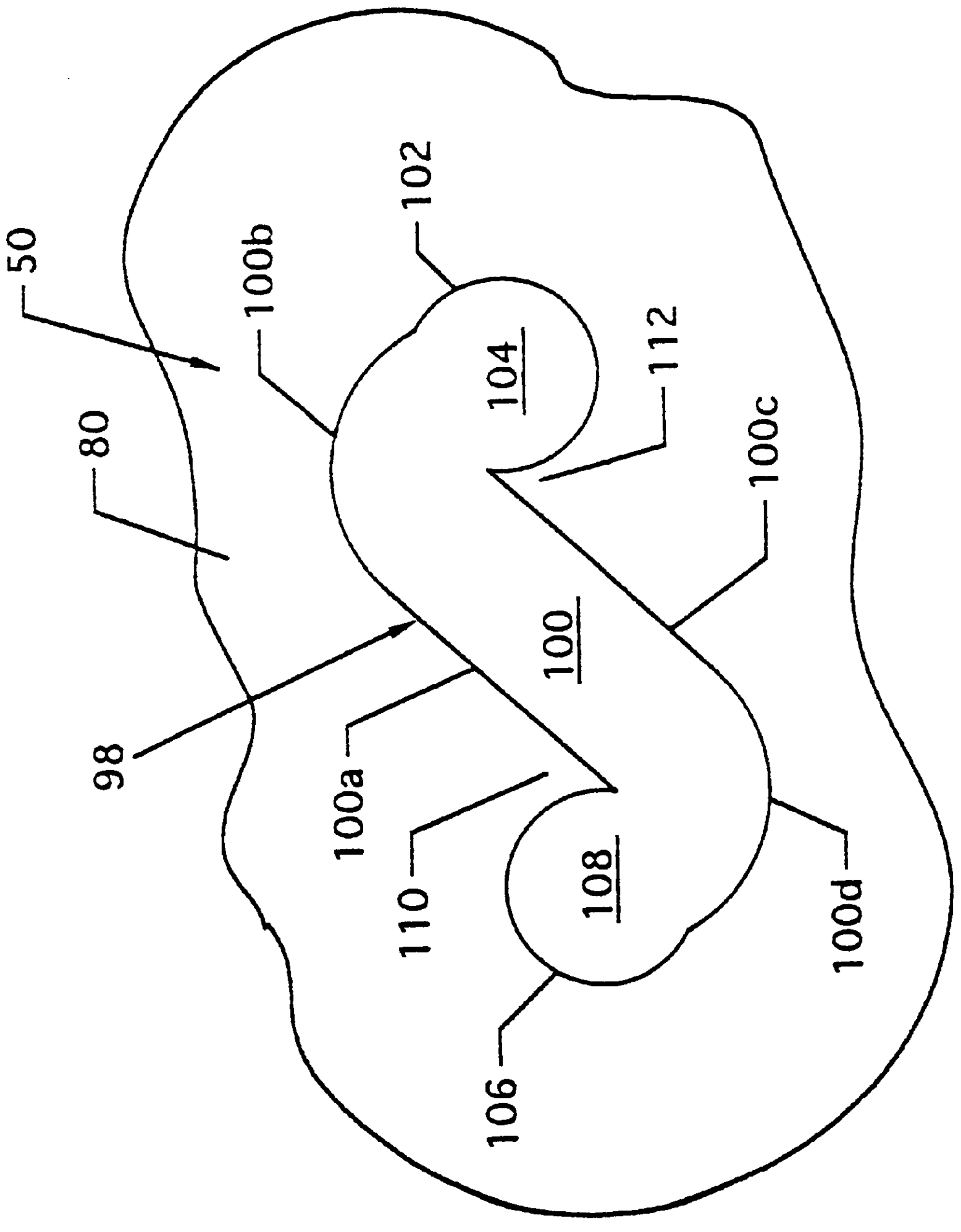
FIG. 6 illustrates a configured cutout shown from the rearward side of the left EMI shield panel.

FIG. 6 illustrates a configured cutout 98 shown from the rearward side of the left EMI shield panel 50, where all numerals correspond to those previously or otherwise described. The configured cutout 98 accommodates the curved section 30a of the left spring latch rod 30. The configured cutout 98 includes a centrally located insertion slot portion 100 having a straight edge 100a and an arced edge 100b which extends from the straight edge 100a. The arced edge 100b intersects an arced edge 102 of lesser radius which defines a partial round hole 104 into which part of the left spring latch rod 30 is inserted. A straight edge 100c opposes the straight edge 100a and extends from the arced edge 102 to continue as an arced edge 100d. The arced edge 100d intersects an arced edge 106 of lesser radius which defines a partial round hole 108 into which part of the left spring latch rod 30 is inserted. A tab 110, which is flexible, is formed between the straight edge 100a and the arced edge 106, and another tab 112, which is flexible, is formed between the straight edge 100c and the arced edge 102.

Figure 7:
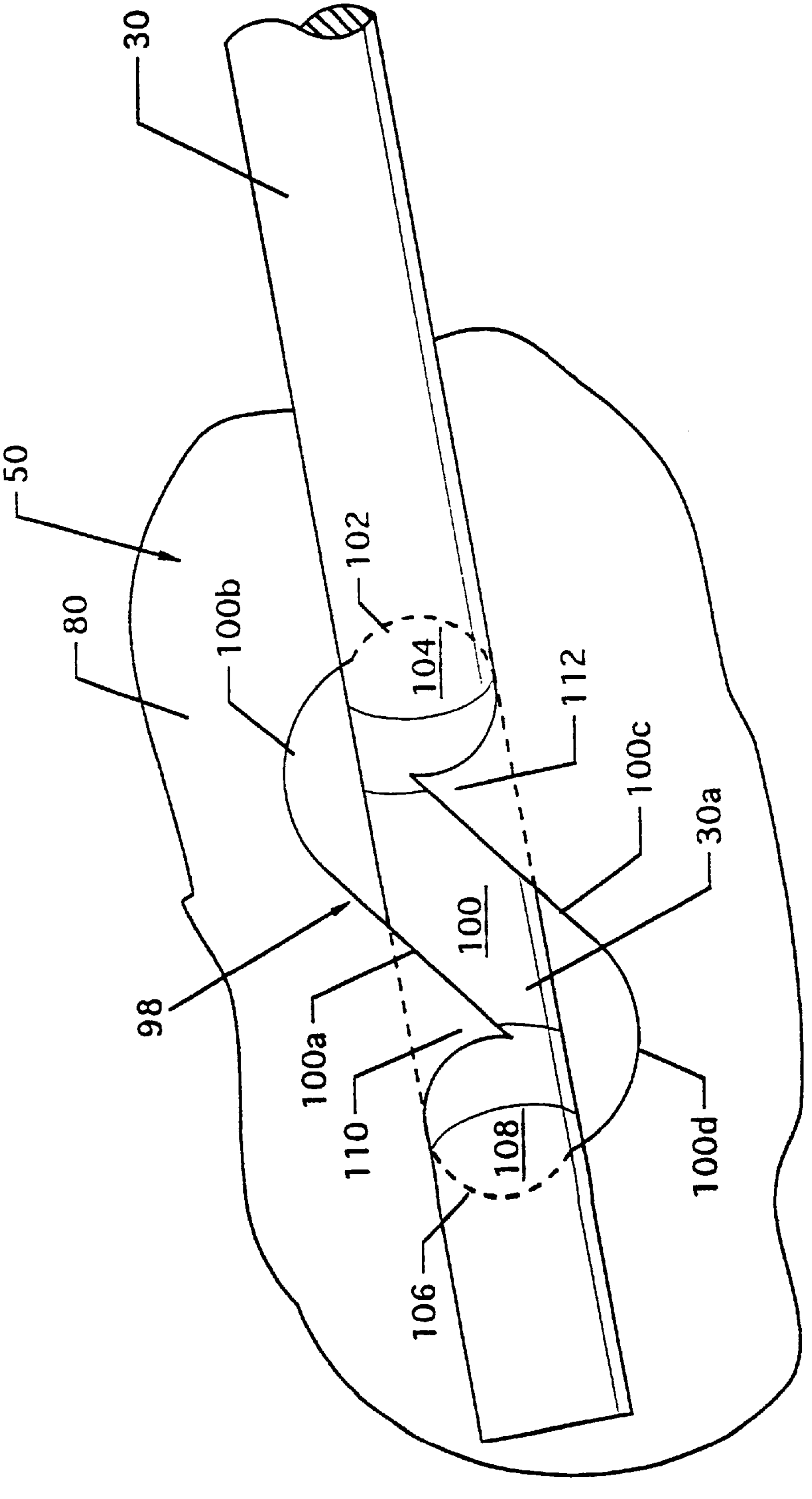
FIG. 7 illustrates the left spring latch rod frictionally engaging the configured cutout shown from the rearward side of the left EMI shield panel.
Figure 8:
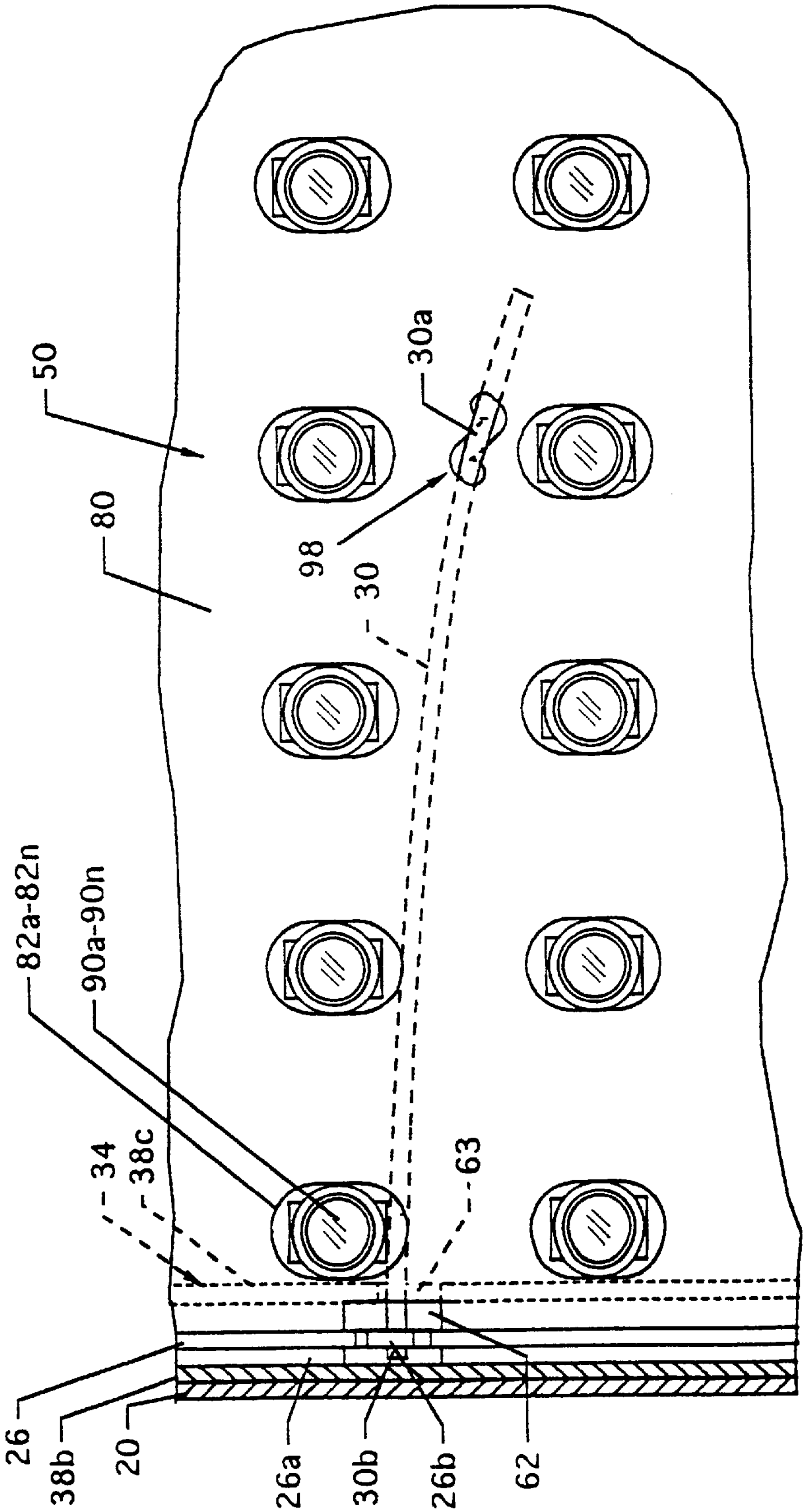
FIG. 8 illustrates the outboard end of the left spring latch rod engaging the catch in cutaway view.

FIG. 7 illustrates the left spring latch rod 30 frictionally engaging the configured cutout 98 shown from the rearward side of the left EMI shield panel 50, where all numerals correspond to those elements previously or otherwise described. The curved section 30a of the left spring latch rod 30 is inserted through the insertion slot 100 and rotated clockwise until the rod snaps into place in the partial round holes 104 and 108, shown in dashed lines. The curved section 30a of the left spring latch rod 30 extends downwardly beneath the tabs 110 and 112 and is visible from the front side of the left EMI shield panel 50, as shown in FIG. 8, which shows the forward side of the left EMI shield panel 50. The tabs 110 and 112 exert pressure upon the left spring latch rod 30 and in conjunction with the partial round holes 104 and 108 mount the left spring latch rod 30 to the left EMI shield panel 50. The left spring latch rod 30 is held at an upward angle with respect to the horizontally aligned members of the left EMI shield panel 50. This upward angle provides for positive spring-like engagement of the outboard end 30b of the left spring latch rod 30 with the catch 26b at the left side panel 20 of the enclosure or frame 14, as shown in FIG. 8.

FIG. 8 illustrates the outboard end 30b of the left spring latch rod 30 engaging the catch 26b in cutaway view, where all numerals correspond to those elements previously or otherwise described. The outboard end 30b of the left spring latch rod 30 extends through the passage 63 in the rearward panel 38c of the left mounting channel 34. The passage 63 is of sufficient height to allow suitable vertical positioning of the left spring latch rod 30 for appropriate engagement or disengagement of the outboard end 30b of the left spring latch rod 30 with the catch 26b. Front release tool slot 62 is suitably located and aligned to the catch 26b to accommodate one end of a front release tool 114 (FIG. 11) used to depress the outboard end 30b of the left spring latch rod 30 when disengagement of the left spring latch rod 30 from the catch 26b is desired from the front.

Figure 9:
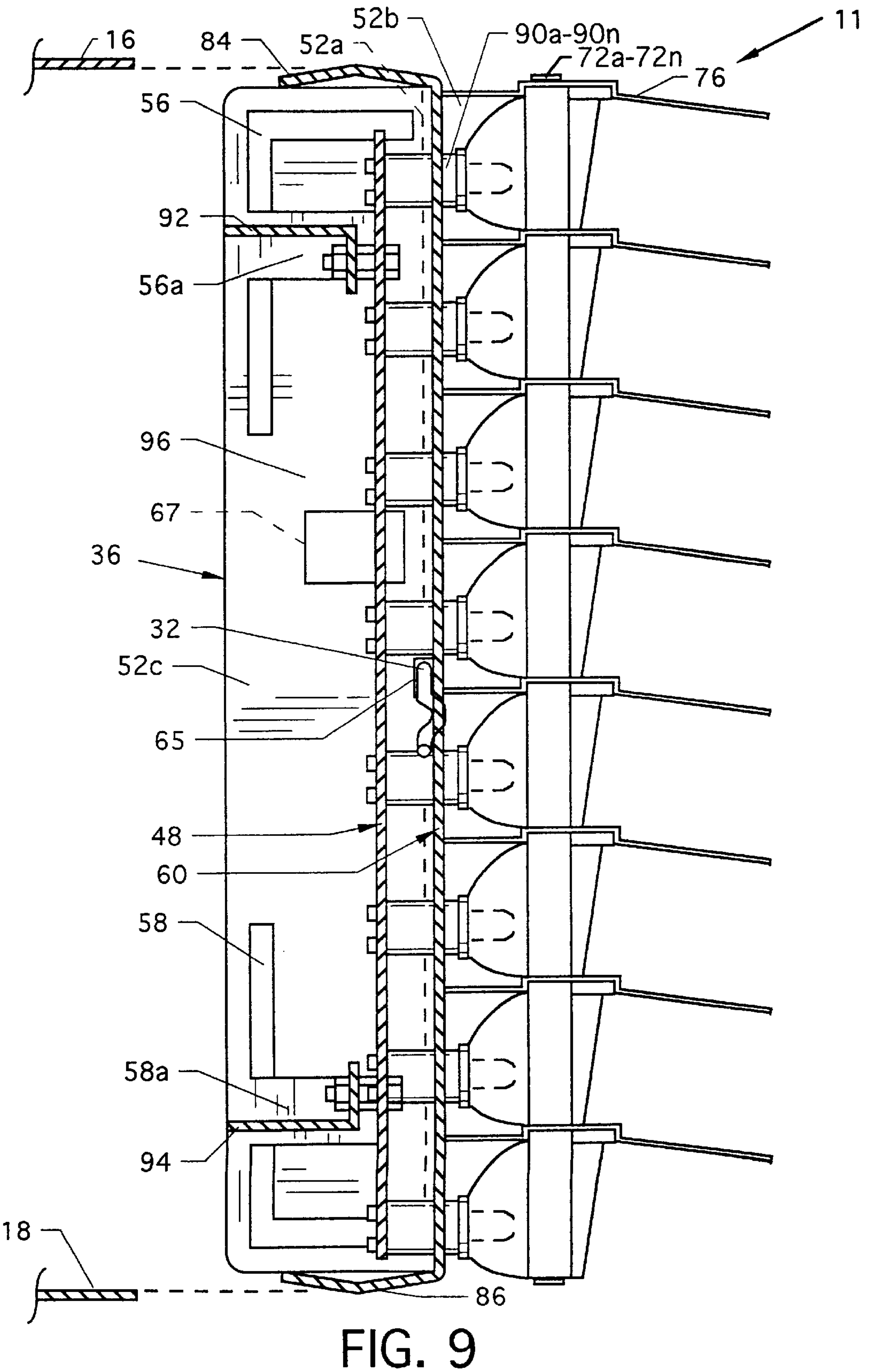
FIG. 9 illustrates a cross sectional view of the sign display module along line 9—9 of FIG. 1.

FIG. 9 illustrates a cross sectional view of the sign display module 11 along line 9—9 of FIG. 1, where all numerals correspond to those elements previously or otherwise described. Spacer bar 95 is not shown for purposes of clarity and brevity. Retainer tabs 56a and 58a are illustrated which engage the rear surface of the circuit/light board assembly 48 to hold the circuit/light board assembly 48 in place. Retainer tabs 44a and 46a perform a like function with the opposing end of the circuit/light board assembly 48.

Figure 10:
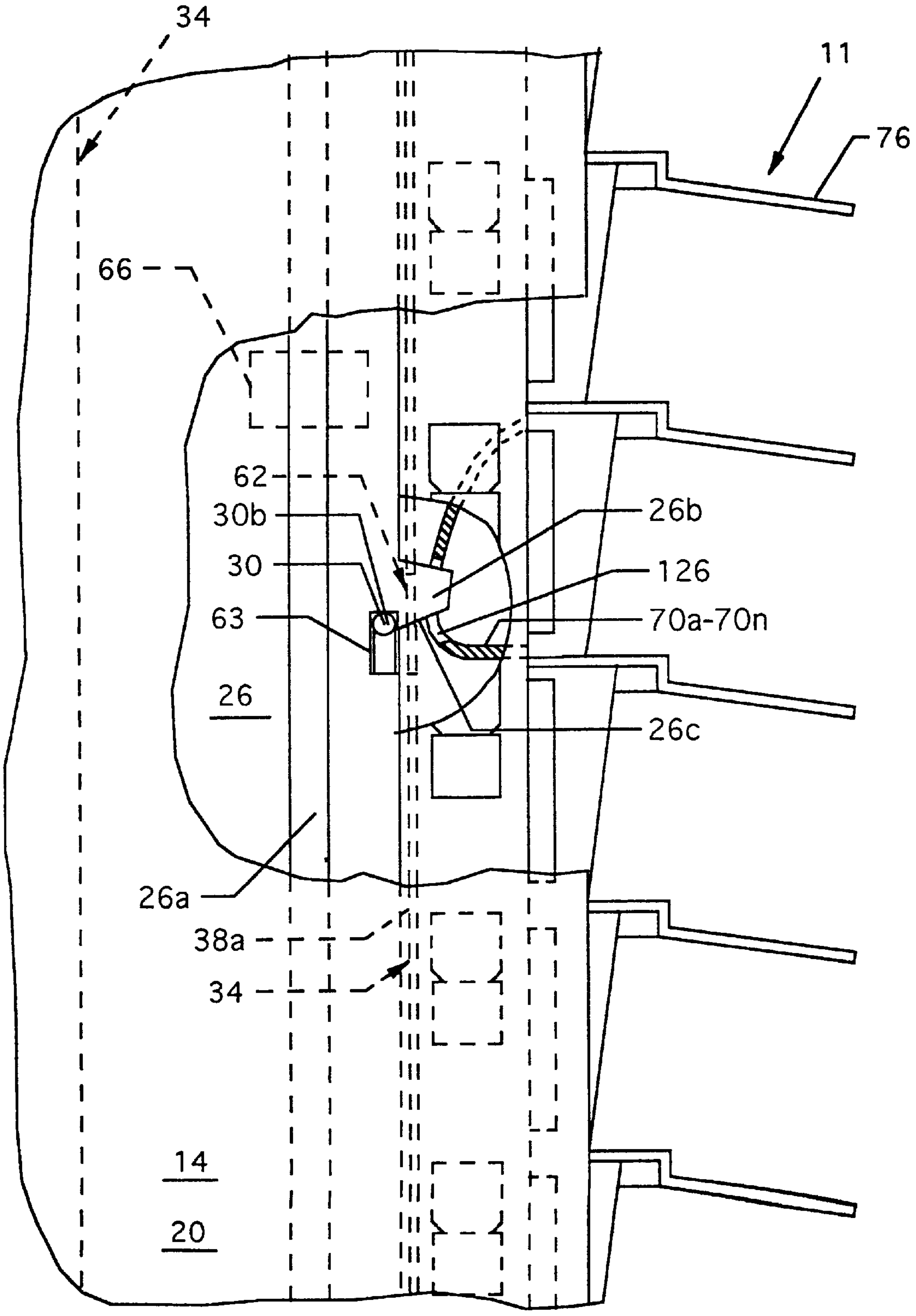
FIG. 10 illustrates a cutaway view showing engagement of the left spring latch rod with the left catch.

FIG. 10 illustrates a cutaway view showing engagement of the left spring latch rod 30 with the catch 26b, where all numerals correspond to those elements previously or otherwise described. Engagement of the left spring latch rod 30 with the catch 26b in conjunction with the engagement of the right spring latch rod 32 with the catch 28b secures the sign display module 11 to the enclosure or frame 14. Catches 26b and 28b are ramped, as shown by the beveled edge 26c of catch 26b, to facilitate automatic positioning of the left spring latch rod 30 and right spring latch rod 32 prior to full engagement during insertion of the sign display module 11 into the enclosure or frame 14. Shown also in this figure is an access hole 126, which is provided in an appropriately located reflector of the plurality of reflector and lens combinations 70a–70n which is aligned with the outboard end 30b of the left spring latch rod 30, through which a front release tool, described later, can be inserted to release the left spring latch rod 30 from the catch 26b. A corresponding appropriately located reflector with an access hole is provided on the opposite side of the sign display module 11 for use in releasing the right spring latch rod 32 from the catch 28*b*.

MODE OF OPERATION

Figure 11:
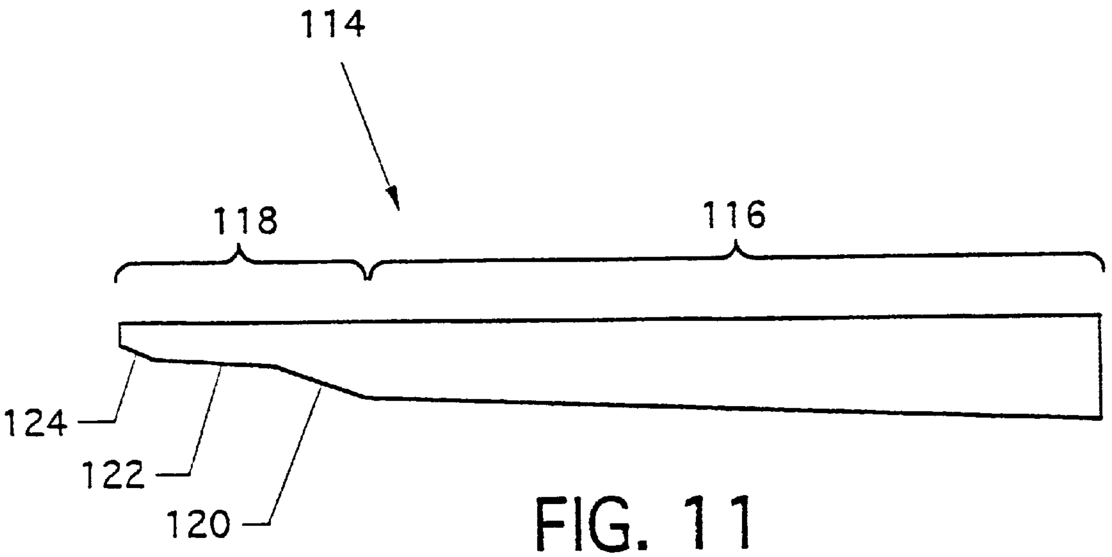
FIG. 11 illustrates a side view of a front release tool.

FIG. 11 illustrates a side view of a front release tool 114, where all numerals correspond to those elements previously or otherwise described. The front release tool 114 is substantially planar and includes a handle 116 and a tip 118. The tip 118 features several angled edges including connected edges 120, 122 and 124. Use of the front release tool 114 is illustrated in FIGS. 12 and 13.

Figure 12:
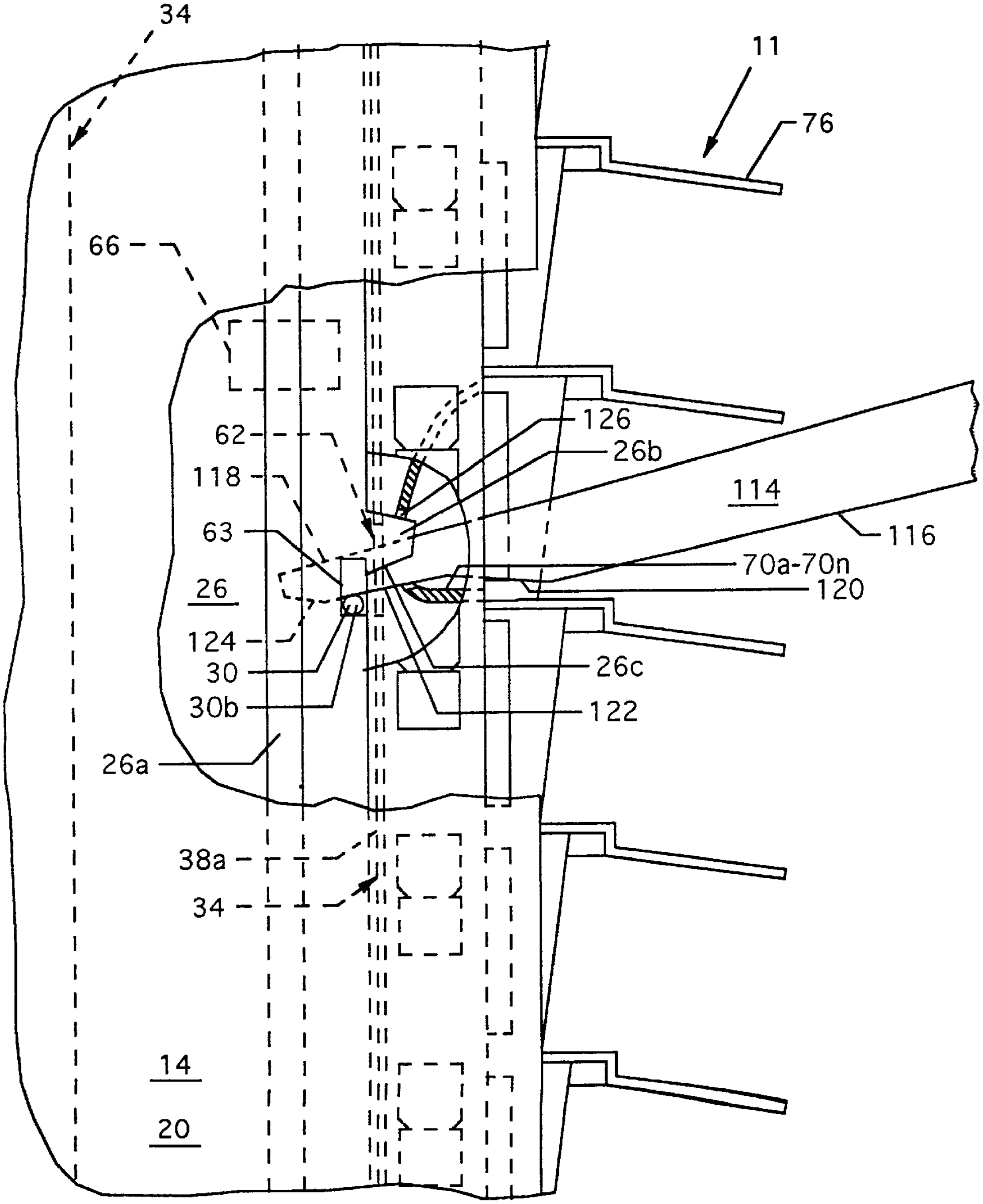
FIG. 12 illustrates the incorporation of the front release tool to release the sign display module from the enclosure or frame in side cutaway view.

FIG. 12 illustrates the incorporation of the front release tool 114 to release the sign display module 11 or a plurality of sign display modules from the enclosure or frame 14 in side cutaway view, where all numerals correspond to those elements previously or otherwise described.

Figure 13:
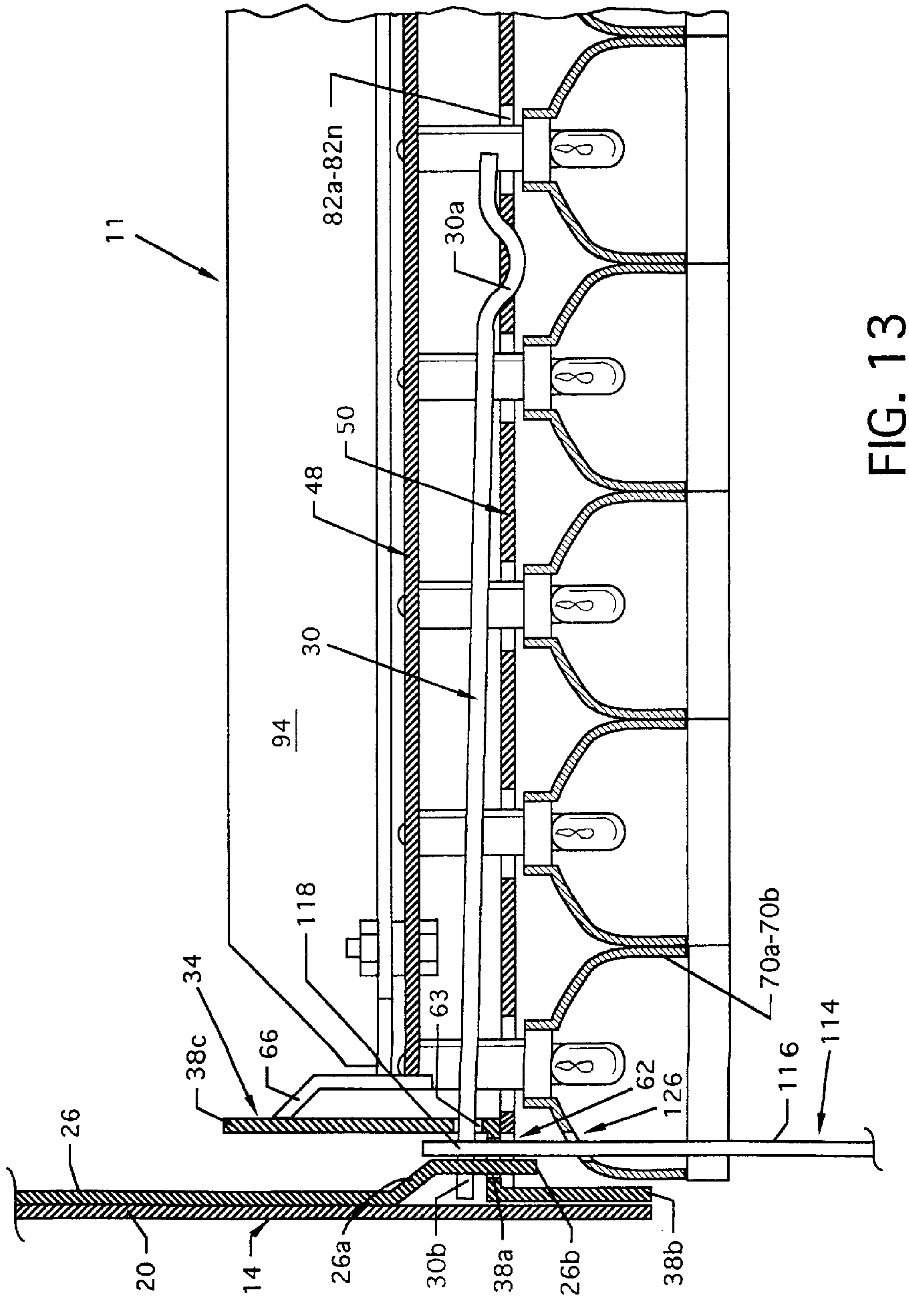
FIG. 13 illustrates a top view of the area shown in FIG. 12.

FIG. 13 illustrates a top view of the area shown in FIG. 12 and of the left spring latch rod 30, and shows the anchoring and routing of the left spring latch rod 30, where all numerals correspond to those elements previously or otherwise described. With reference to FIGS. 12 and 13, the release of the sign display module 11 from the enclosure or frame 14 is now described using the front release tool 114. The lens of the reflector and lens combination in the plurality of reflector and lens combinations 70*a*–70*n* which is appropriately aligned with the outboard end 30*b* of the left spring latch rod 30 is removed to gain access to the access hole 126. Then the tip 118 of the front release tool 114 is inserted through the access hole 126 and through the front release tool slot 62 in the center panel 38*a* of the left mounting channel 34 to simultaneously contact and downwardly depress the outboard end 30*b* of the left spring latch rod 30. Any of the angled edges 120, 122 or 124 can be utilized throughout the depressing process either singularly or in sequence to strike and depress the outboard end 30*b* of the left spring latch rod 30. The handle 116 is manually grasped and can be inserted as previously described and actuated to depress the outboard end 30*b* of the left spring latch rod 30. One method of actuation can be that of merely moving the front release tool 114 downwardly against the slight spring tension of the left spring latch rod 30 without changing the angular relation of the front release tool 114 to cause depression of the outboard end 30*b* of the left spring latch rod 30 to a position as illustrated in FIG. 12. Another method of actuation can be that of pivoting the front release tool 114 about the upper edge of front release tool slot, a horizontal axis, causing downward motion of an angled edge 120, 122 or 124 of the tip 118 against the slight spring tension of the left spring latch rod 30 to cause depression of the outboard end 30*b* of the left spring latch rod 30 to a position as illustrated in FIG. 12. Subsequent to downward repositioning and removal of the outboard end 30*b* of the left spring latch rod 30 from influence of the catch 26*b*, the left side of the sign display module 11 is pulled forwardly out of the area of catch 26*b* influence while the outboard end 30*b* of the left spring latch rod 30 is held down by the front release tool 114. The front release tool 114 is then removed and the outboard end 30*b* allowed to rest on the beveled edge 26*c* to await further outward positioning of the left side of the sign display module 11. The front release tool 114 then can be used to depress and position the opposing right spring latch rod 32 from the opposing catch 28*b* to release the right side of the sign display module 11 from the enclosure or frame 14. Alternatively, two front release tools 114 can be used for simultaneous release of the opposing left and right spring latch rods 30 and 32 from the catches 26*b* and 28*b*, respectively, to release the sign display module 11 from the enclosure or frame 14. After the sign display module 11 is released from both catches 26*b* and 28*b*, it is pulled out of the enclosure or frame 14.

Figure 14:
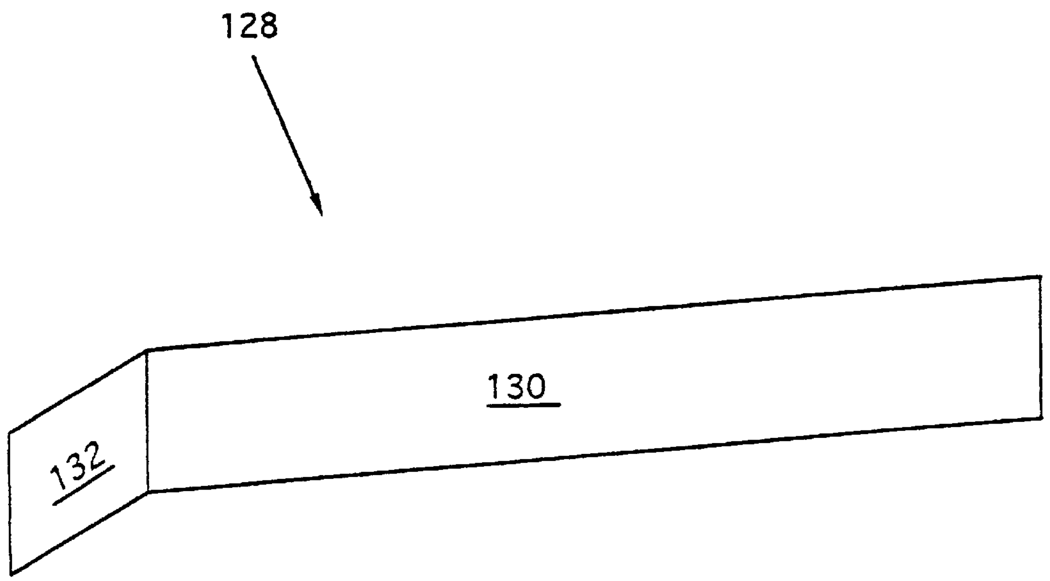
FIG. 14 illustrates a view of a rear release tool incorporated to release the sign d lay module from an enclosure or frame.

FIG. 14 illustrates a view of a rear release tool 128 incorporated to release the sign display module 11 from an optional backless version of the enclosure or frame 14, where all numerals correspond to those elements previously or otherwise described. The rear release tool 128, which is used as a lever, is incorporated where one or more sign display modules 11 are mounted in an open back enclosure or frame or other such display fixture incorporating catch panels such as left and right catch panels 26 and 28 having a plurality of catches 26*b* and 28*b*, as previously described. The one-piece rear release tool 128 includes a planar handle 130 and a planar pry bar end 132 intersecting the planar handle 130 at an angle. The pry bar end 132 is inserted from the rear of the sign display module 11 to release the sign display module 11 from the left and right catch panels 26 and 28, as described in connection with FIGS. 15 and 16.

Figure 15:
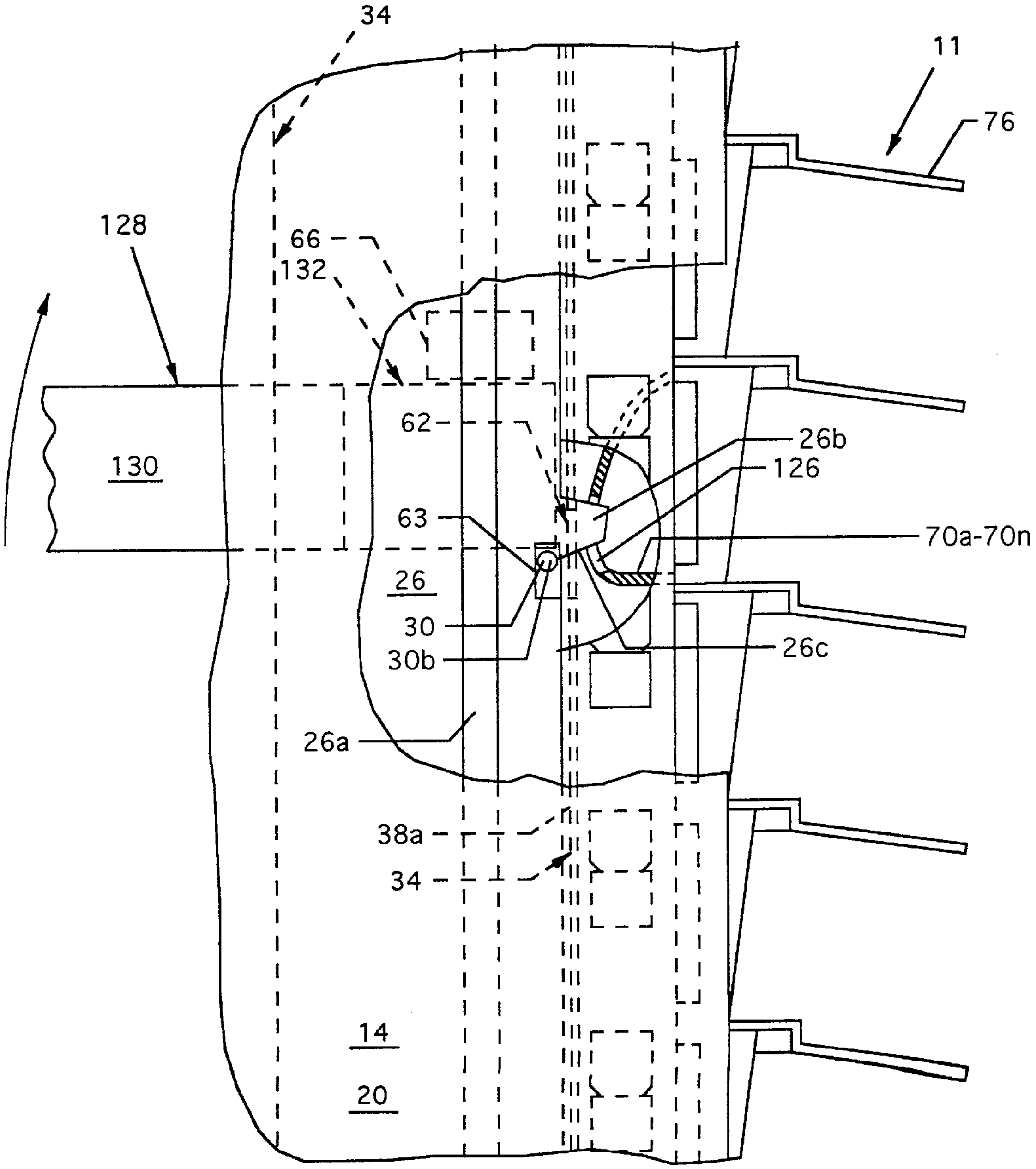
FIG. 15 illustrates the incorporation of the rear release tool to release the sign display module from the enclosure or frame in side cutaway view; and, FIG. 16 illustrates a top view of the area shown in FIG. 15.

FIG. 15 illustrates the incorporation of the rear release tool 128 to release the sign display module 11 from the enclosure or frame 14 in side cutaway view, where all numerals correspond to those elements previously or otherwise described. The rear release tool 128 is inserted as shown, and, with the upper edge bearing against fulcrum tab 66, is rotated in the direction shown by the arrow, causing the lower edge to depress the outboard end 30*b* of spring latch rod 30 thereby freeing rod 30 from catch 26*b*.

Figure 16:
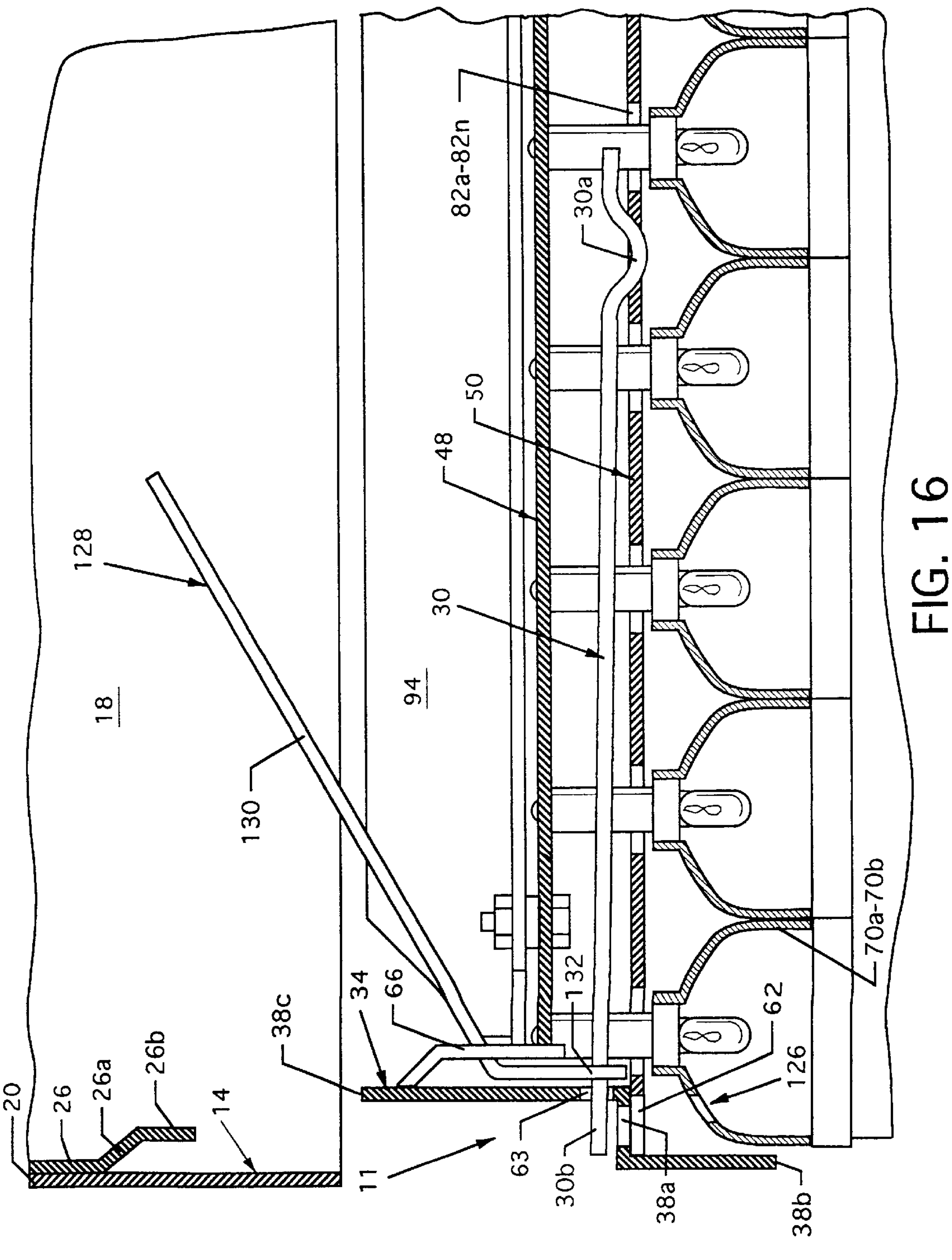

FIG. 16 illustrates a top view of the area shown in FIG. 15 and of the left spring latch rod 30, and shows the anchoring and routing of the left spring latch rod 30, where all numerals correspond to those elements previously or otherwise described. With reference to FIGS. 15 and 16, the release of the sign display module 11 from the enclosure or frame 14 is now described using the rear release tool 128. The rear release tool 128 is placed to align and impinge the top edge of the pry bar end 132 with the bottom edge of the fulcrum tab 66 located on the rearward panel 38*c* of the left mounting channel 34 and to align the bottom edge of the pry bar end 132 with the outboard end 30*b* of the left spring latch rod 30. The handle 130 is then rotated upwardly and twisted to rotate the pry bar end 132 about the bottom edge of the fulcrum tab 66, thereby causing the outboard end of the pry bar end 132 to move downwardly and to impinge the outboard end 30*b* of the left spring latch rod 30 causing downward movement of the outboard end 30*b*. Downward movement of the outboard end 30*b* of the left spring latch rod 30 removes the outboard end 30*b* from influence of the catch 26*b* of the left catch panel 26, thereby allowing one side of the sign display module 11 to be removed from the left catch panel 26 while the outboard end 30*b* is held down by the pry bar end 132. The rear release tool 128 can then be used to release the right spring latch rod 32 from influence of the catch 28*b* of the right catch panel 28 in the manner just described or, in the alternative, two rear release tools 128 can be utilized for simultaneous release. After the sign display module 11 is released from both catches 26*b* and 28*b*, it is pushed out of the enclosure or frame 14.

Finally, catches 26*b* and 28*b* come into contact with the top of front release tool slots 62 and 64 to utilize the existing parts to provide vertical support stacking of modules above each other. This provides precision alignment as well as eliminating single purpose parasitic parts.

Various modifications can be made to the present invention without departing from the apparent scope hereof.

QUICK CHANGE DISPLAY SYSTEM

| | | | |
|---|---|---|---|
| 10 | sign display system | 38a | center panel |
| 11 | sign display module | 38b | forward panel |
| | | 38c | rearward panel |
| 12 | forward unit | 40a-n | slots |
| 13 | rearward unit | 42 | reflector/lens/louver assembly |
| 14 | enclosure or frame | | |
| 16 | top panel | 44 | cutout |
| 18 | bottom panel | 44a | retainer tab |
| | | 46 | cutout |
| 20 | left side panel | 46a | retainer tab |
| 22 | right side pane | 48 | circuit/light board assembly |
| 24 | rear panel | 50 | left EMI shield panel |
| 26 | left catch panel | 52a | center panel |
| 26a | angled end | 52b | forward panel |
| 26b | catch | 52c | rearward panel |
| 26c | beveled edge | 54a-n | slots |
| 28 | right catch panel | 56 | cutout |
| 28a | angled end | 56a | retainer tab |
| 28b | catch | 58 | cutout |
| 30 | left spring latch rod | 58a | retainer tab |
| 30a | curved section | 60 | right EMI shield panel |
| 30b | outboard end | 62 | front release tool slot |
| 32 | right spring latch rod | 63 | passage |
| | | 64 | front release tool slot |
| 34 | left mounting channel | 100a | straight edge |
| 36 | right mounting channel | 100b | arced edge |
| | | 100c | straight edge |
| 65 | passage | 100d | arced edge |
| 66 | fulcrum tab | 102 | arced edge |
| 67 | fulcrum tab | 104 | partial round hole |
| 68a-n | modules | 106 | arced edge |
| 70a-n | reflector and lens combinations | 108 | partial round hole |
| | | 110 | tab |
| 72a-n | protrusions | 112 | tab |
| 74a-n | slots | 114 | front release tool |
| 76 | louver | 116 | handle |
| 78 | left protrusion | 118 | tip |
| 80 | planar portion | 120 | angled edge |
| 82a-n | orifices | 122 | angled edge |
| 83a-n | orifices | 124 | angled edge |
| 84 | top angled surface | 126 | access hole |
| 86 | lower angled surface | 128 | rear release tool |
| 88 | vertically aligned tab | 130 | handle |
| | | 132 | pry bar end |
| 90a-n | incandescent lights | | |
| 92 | upper support bar | | |
| 94 | lower support bar | | |
| 95 | spacer bar | | |
| 96 | support bar | | |
| 98 | configured cutout | | |
| 100 | insertion slot portion | | |

What is claimed is:

1. A process for removing a sign display module from a frame from the front or back, comprising the steps of:

a. from the front of the rack:

(1) removing a lens from an illuminating reflector of a module;

(2) inserting a stepped tip of a front tool means through a hole in the reflector;

(3) engaging said tool against a rod latched on a hook with said front tool;

(4) moving said tool downwardly to disengage said rod;

(5) repeating steps (1) through (4) on an other side of said module;

(6) pulling said module out of said frame; or, b. from the back of the rack:

(1) inserting an angled pry bar end of a back tool means between said module and said rod;

(2) twisting said back tool and pushing said module outward to disengage one side of said module from said frame;

(3) repeating steps (1) and (2) on an other side of said module;

(4) pushing said module out of said frame.

2. A process according to claim 1, wherein step a(4) comprises rotational motion of said front tool about a pivot point.

3. A process according to claim 2, wherein said pivot point is the upper edge of a slot accommodating said front tool.

4. A process according to claim 2, wherein the twisting of step b(2) comprises rotational motion of said back tool about a second pivot point.

5. A process according to claim 4, wherein said second pivot point is the edge of a fulcrum tab affixed to said display module.

6. A process according to claim 1, wherein said twisting of step b(2) comprises rotational motion of said back tool about a second pivot point.

7. A process according to claim 6, wherein said second pivot point is the edge of a fulcrum tab affixed to said display module.

8. A process of removing a sign display module having a front and a rear from a frame to which it is latched by manipulating the sign display module from its front or its rear, both the frame and the sign display module forming parts of a sign display system, the frame including catches therewithin on opposing sides, and the sign display module including latches on opposing sides latched to said catches and also including a plurality of illuminating devices each with an associated reflector and lens combination, two of said reflector and lens combinations being located at opposing sides of said sign display module in alignment with said latches, and the reflectors of said two reflector and lens combinations each having an access hole therethrough directly in line with the respective latch, the process of removing comprising the steps of:

a. from the front of said sign display module:

(1) removing a lens to provide access to the access hole through the reflector which is aligned with the latch on one side of said sign display module that is latched to the catch on one side of said frame;

(2) obtaining a tool having a tip end and inserting said tip end of said tool from the front of said sign display module through said access hole through the reflector which is aligned with the latch that is latched to the catch on said one side of said frame;

(3) engaging said tip end of said tool against said latch that is latched to the catch on said one side of said frame;

(4) moving said tool to unlatch said latch from the catch at said one side of said frame, thereby releasing said one side of said sign display module from said one side of said frame;

(5) performing steps (1) through (4) on the opposing side of said sign display module, thereby releasing the opposing side of said sign display module from the opposing side of said frame; and, (6) pulling the released sign display module out of said frame; or, b. from the rear of said sign display module:

(1) obtaining a tool having a pry bar end and inserting said pry bar end of said tool from the rear of said sign display module into a space on one side of said sign display module adjacent to the latch on that side which is latched to the catch on the associated side of said frame;

(2) engaging said pry bar end of said tool against the latch that is latched to the catch on said associated side of said frame;

(3) moving said tool to unlatch said latch from the catch at said associated side of said frame, thereby releasing said one side of said sign display module from said associated side of said frame;

(4) performing steps (1) through (3) on the opposing side of said sign display module, thereby releasing the opposing side of said sign display module from the opposing side of said frame; and, (5) pushing the released sign display module out of said frame.

9. The process according to claim 8, wherein step a(4) includes rotational motion of said tool having a tip end about a pivot point.

10. The process according to claim 8, wherein step b(3) includes rotational motion of said tool having a pry bar end about a pivot point.

11. The process according to claim 8, wherein step b(3) includes both rotational motion and twisting motion of said tool having a pry bar end.

12. A process of removing a sign display module having a front and a rear from a frame to which it is latched by manipulating the sign display module from its front, both the frame and the sign display module forming parts of a sign display system, the frame including catches therewithin on opposing sides, and the sign display module including latches on opposing sides latched to said catches and also including a plurality of illuminating devices each with an associated reflector and lens combination, two of said reflector and lens combinations being located at opposing sides of said sign display module in alignment with said latches, and the reflectors of said two reflector and lens combinations each having an access hole therethrough directly in line with the respective latch, the process of removing comprising the steps of:

(1) removing a lens to provide access to the access hole through the reflector which is aligned with the latch on one side of said sign display module that is latched to the catch on one side of said frame;

(2) obtaining a tool having a tip end and inserting said tip end of said tool from the front of said sign display module through said access hole through the reflector which is aligned with the latch that is latched to the catch on said one side of said frame;

(3) engaging said tip end of said tool against said latch that is latched to the catch on said one side of said frame;

(4) moving said tool to unlatch said latch from the catch at said one side of said frame, thereby releasing said one side of said sign display module from said one side of said frame;

(5) performing steps (1) through (4) on the opposing side of said sign display module, thereby releasing the opposing side of said sign display module from the opposing side of said frame; and, (6) pulling the released sign display module out of said frame.

13. The process according to claim 12, wherein step (4) includes rotational motion of said tool having a tip end about a pivot point.

14. A process of removing a sign display module having a front and a rear from a frame to which it is latched by manipulating the sign display module from its rear, both the frame and the sign display module forming parts of a sign display system, the frame including catches therewithin on opposing sides and the sign display module including latches on opposing sides latched to said catches, the process of removing comprising the steps of:

(1) obtaining a tool having a pry bar end and inserting said pry bar end of said tool from the rear of said sign display module into a space on one side of said sign display module adjacent to the latch on that side which is latched to the catch on the associated side of said frame;

(2) engaging said pry bar end of said tool against the latch that is latched to the catch on said associated side of said frame;

(3) moving said tool to unlatch said latch from the catch at said associated side of said frame, thereby releasing said one side of said sign display module from said associated side of said frame;

(4) performing steps (1) through (3) on the opposing side of said sign display module, thereby releasing the opposing side of said sign display module from the opposing side of said frame; and, (5) pushing the released sign display module out of said frame.

15. The process according to claim 14, wherein step (3) includes rotational motion of said tool having a pry bar end about a pivot point.

16. The process according to claim 14, wherein step (3) includes both rotational motion and twisting motion of said tool having a pry bar end.

* * * * *